Jan. 13, 1942.    R. M. WOYTYCH    2,269,641
MACHINE TOOL
Filed June 7, 1939    6 Sheets-Sheet 5

INVENTOR
Raymond M. Woytych
By Parker, Carlson, Pitzner & Hubbard
ATTORNEYS

Jan. 13, 1942. R. M. WOYTYCH 2,269,641
MACHINE TOOL
Filed June 7, 1939 6 Sheets-Sheet 6

INVENTOR
Raymond M. Woytych
By Parker, Carlson, Pitzner & Hubbard
ATTORNEYS

Patented Jan. 13, 1942

2,269,641

UNITED STATES PATENT OFFICE 2,269,641

MACHINE TOOL

Raymond M. Woytych, Fond du Lac, Wis., assignor to Giddings & Lewis Machine Tool Co., Fond du Lac, Wis., a corporation of Wisconsin Application June 7, 1939, Serial No. 277,757

9 Claims. (Cl. 29—26)

The invention relates to improvements in machine tools, and has particular reference to a novel attachment which is especially adapted for use with horizontal boring, drilling and milling machines.

A general aim of the present invention is to provide a new and improved machine tool adapted to carry out a continuous-feed facing operation in which a facing tool is moved in a spiral path over a surface being faced.

A more specific object of the invention is the provision of a novel facing attachment adapted to be driven from a tool headstock such, for example, as that of a horizontal boring, milling and drilling machine, and which is arranged to move a facing tool thereon in a spiral path by feeding the tool transversely across the work piece surface in accurately timed relation with the tool rotation, the attachment being characterized particularly by its compactness, low weight and concentric distribution of the weight about its axis of rotation.

Another object is the provision of an attachment of the foregoing character embodying a novel speed change mechanism of extreme compactness and low weight for adjusting the rate of tool feed transversely of the work piece surface so as to adjust the spacing between convolutions of the spiral to accommodate different degrees of fineness of finish, etc.

Another more general object is to provide an improved machine tool affording a wide and flexible range of machining operations including, for example, facing, boring and drilling.

Still another object is to provide an improved attachment adapted to be driven from a tool headstock and by means of which a plurality of tools may be utilized either simultaneously or sequentially to perform a corresponding plurality of machining operations.

Further objects and advantages of the invention will become apparent as the following description proceeds, taken in connection with the accompanying drawings, in which.

While the invention is susceptible of various modifications and alternative constructions I have shown in the drawings and will herein describe in detail the preferred embodiment, but it will be understood that I do not thereby intend to limit the invention to the specific form disclosed, but intend to cover all modifications and alternative constructions falling within the spirit and scope of the invention as expressed in the appended claims.

For purposes of exemplification, the invention has been shown herein (Fig. 1) as embodied in a horizontal boring, drilling and milling machine. Machines of the type are provided in various forms. In the form selected for purposes of illustration, the machine comprises an elongated horizontal bed 10 above the central portion of which is located a work table 11. On opposite sides of the table 11 are an adjustably mounted tailstock column 12 and a headstock column 14.

Figure 1:
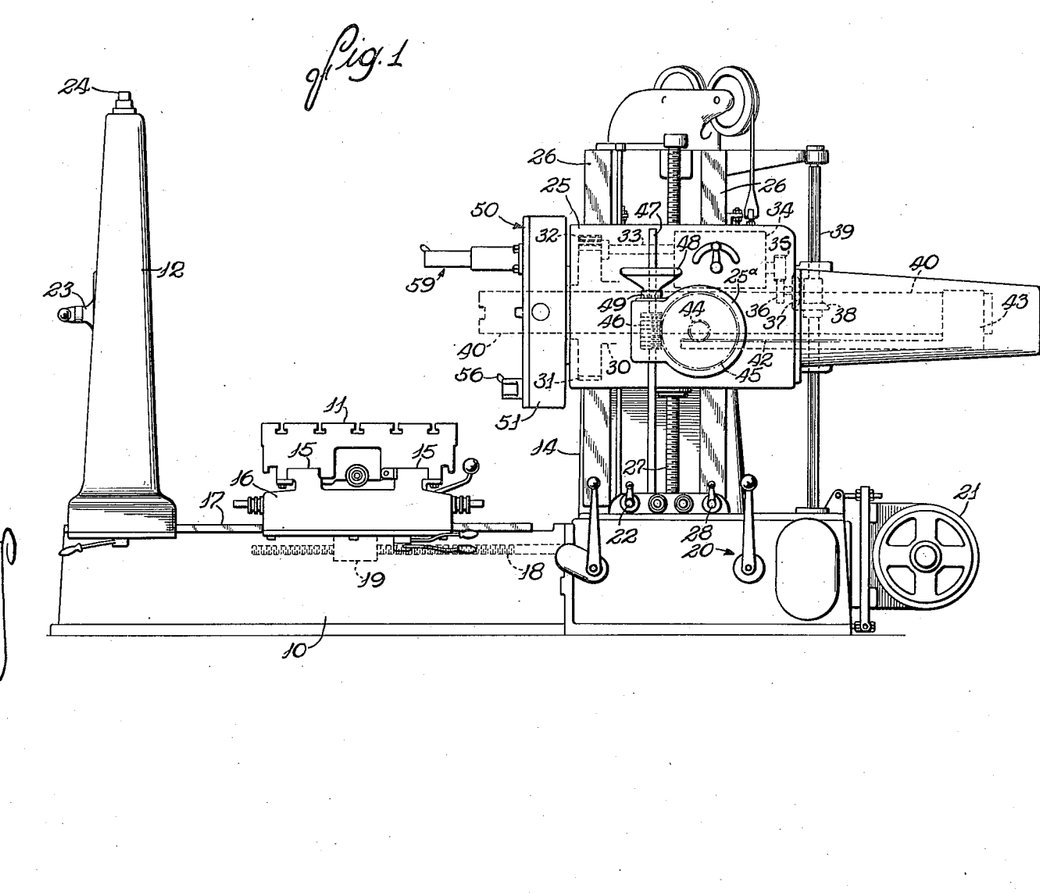
Figure 1 is a front elevational view of a horizontal boring, drilling, and milling machine with an attachment embodying the features of the invention.

The work table 11 is slidable endwise along ways 15 fashioned on the top of a saddle 16, which is in turn slidable in a direction transverse to the table along ways 17 formed on the top of the bed 10. Any suitable means may be provided, available at will for traversing the saddle 16 along the bed 10. In the present instance this means comprises a horizontal feed screw 18 which extends along the interior of the bed 10 and which at one end is in threaded engagement with a fixed nut 19 on the underside of the saddle 16. The other end of the screw 18 is operatively connected through a gear transmission mechanism, indicated generally at 20 to an electric drive motor 21 mounted on the right end of the bed 10. A lever 22 is available to control the direction of drive. The details of the transmission mechanism per se constitute no part of the present invention and, hence, are not disclosed herein. A suitable mechanism is shown and described in Patent No. 1,858,491, issued May 17, 1932, to Keith F. Gallimore.

On the tailstock column 12 is a vertically slidable tailstock 23 mounted on ways fashioned on the column. This tailstock is adapted to be traversed along the ways by means of a vertical feed screw 24 operable from any suitable power means such as the transmission 20.

At the opposite end of the machine, a headstock 25 is slidably mounted on vertical ways 26 formed on the front face of the headstock column 14. The head stock 25 is supported and adapted to be traversed by means of a vertical feed screw 27 connected at its lower end to the power transmission 20. The screws 24 and 27 in the tail stock and headstock columns, respectively, are adapted to be driven in synchronism and to traverse the tailstock 23 and the headstock 25 at the same speeds, the direction of drive being under the control of a hand lever 28. The details of the connections between the transmission 20 and the feed screws 18, 24 and 27, constitute no part of the present invention and, hence, are not disclosed herein. Suitable connections are shown in the above mentioned Gallimore patent.

Rotatable in the headstock 25, and opening through the left end thereof, is a main horizontal spindle member in the form of a sleeve 30. Any suitable means may be provided for driving this sleeve 30, and in the present instance this means is shown as comprising a concentric gear 31 rigid with the sleeve. The gear 31 meshes with a small pinion 32 which is connected through a shaft 33 to a speed-change mechanism 34. The power inlet to the transmission 34 is connected through a train of gears 35, 36 and 37, to a gear 38 slidably splined on a vertically-anchored shaft 39 which extends through the headstock 25, and which is operatively connected at its lower end to the motor 21.

An elongated tool spindle 40 extends through and is splined for axial movement in the sleeve 30. Accordingly, the sleeve 30 constitutes a drive member for the spindle 40. The left end of the spindle projects from the headstock 25 and has a transversely slotted outer end to which may be attached a socketed tool holder extension 41 (Fig. 3) in which a boring tool (not shown) may be secured. The spindle 40 may be rotated and fed axially when used to drive such a tool secured to its outer end. Axial adjustment of the spindle 40 may be accomplished either manually or by power and the means for this purpose preferably comprises an elongated parallel gear rack 42 which is anchored at one end by a rotary splined connection 43 to the inner end of the spindle. The free end of the rack 42 meshes with a pinion 44 rotatable with a large worm wheel 45 in a housing 25ᵃ on the front of the headstock 25. Meshing with the worm wheel 45 is a worm 46 axially splined on a vertical shaft 47 extending through the housing 25ᵃ. The lower end of the shaft 47 is adapted to be connected to the transmission 20 for a power drive. A hand wheel 48 is secured to the upper end of the shaft 47, and affords means for effecting a manual adjustment of the spindle 40. The position of adjustment is indicated by a suitable micrometer 49.

Figure 7:
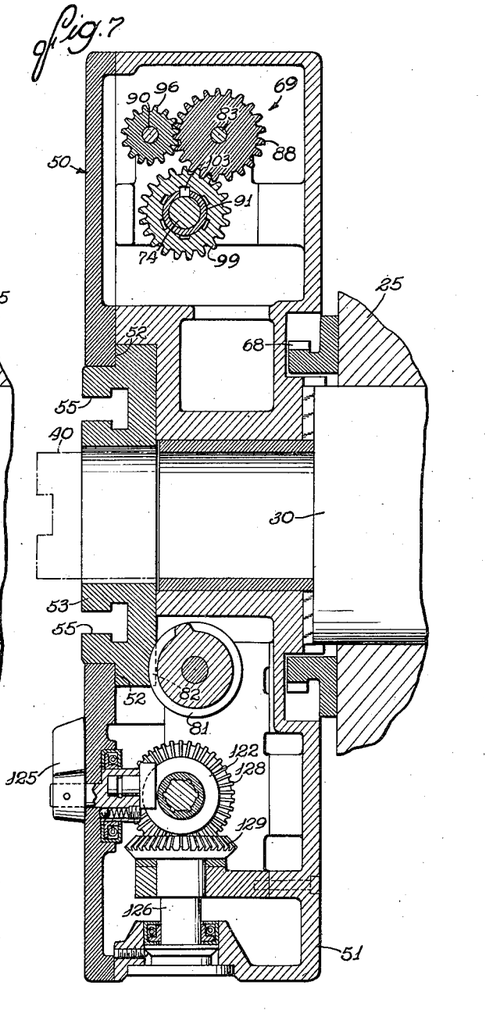

A novel form of facing, boring, drilling and tapping attachment, designated generally by the numeral 50 and herein referred to for the sake of brevity as the "facing attachment," is fixed on the forward or left hand end of the sleeve 30 (Fig. 1). This facing attachment or tool support, being fast on the sleeve 30, is rotated with it. In its illustrative form the facing attachment 50 comprises a generally cylindrical or drum shaped housing 51 arranged coaxially with the sleeve 30 and having its rear face bolted to the latter. Extending diametrically across the front face of the housing 51 in a vertical plane are ways 52 (Fig. 2 and see also Fig. 7) on which a tool slide 53 is slidably mounted for endwise movement in a path transverse to and intersecting the axis of rotation of the housing. An elongated central slot 54 is fashioned in the slide 53 to receive the projecting end of the spindle 40 so that the slide 53 may be moved freely along the ways without interfering with the spindle. T slots 55 extending along the face of the slide 53 accommodate the fastening of various boring or facing tools on the slide. For example, in Fig. 3, a facing tool 56 has been shown mounted in a facing tool block 57, which is secured to the slide 53 by bolts 58 having their heads in the T slots. Similarly, a telescopic boring tool designated generally by the numeral 59 has also been shown attached to the slide 53. Various other forms of tools may be secured to the slide such, for example, as an offset boring tool 59ᵃ shown in dot-dash lines in Fig. 3.

Briefly stated, facing is, in the present machine, accomplished by moving the facing or scalping tool 56 across a work piece surface in a spiral path so as to cover progressively the area to be faced. For this purpose the tool 56 is fixed to the slide 53 as noted above and the latter is fed along the ways 52 in exact timed relation with the rotation of the housing 51. To insure proper timing a common power actuator is utilized for imparting both the feeding and rotative motions to the tool. Furthermore, provision is made for adjusting the rate of slide feed with respect to the rate of rotation so as to control the spacing of adjacent convolutions of the spiral, or, in other words, the pitch or "tightness" of the spiral. The arrangement is preferably such that the slide 53 can be fed at its selected rate either toward or away from the axis of housing rotation so that the spiral path of the tool may be traversed either from its periphery in toward the center or vice versa.

Figures 2, 3, 4, 4A:
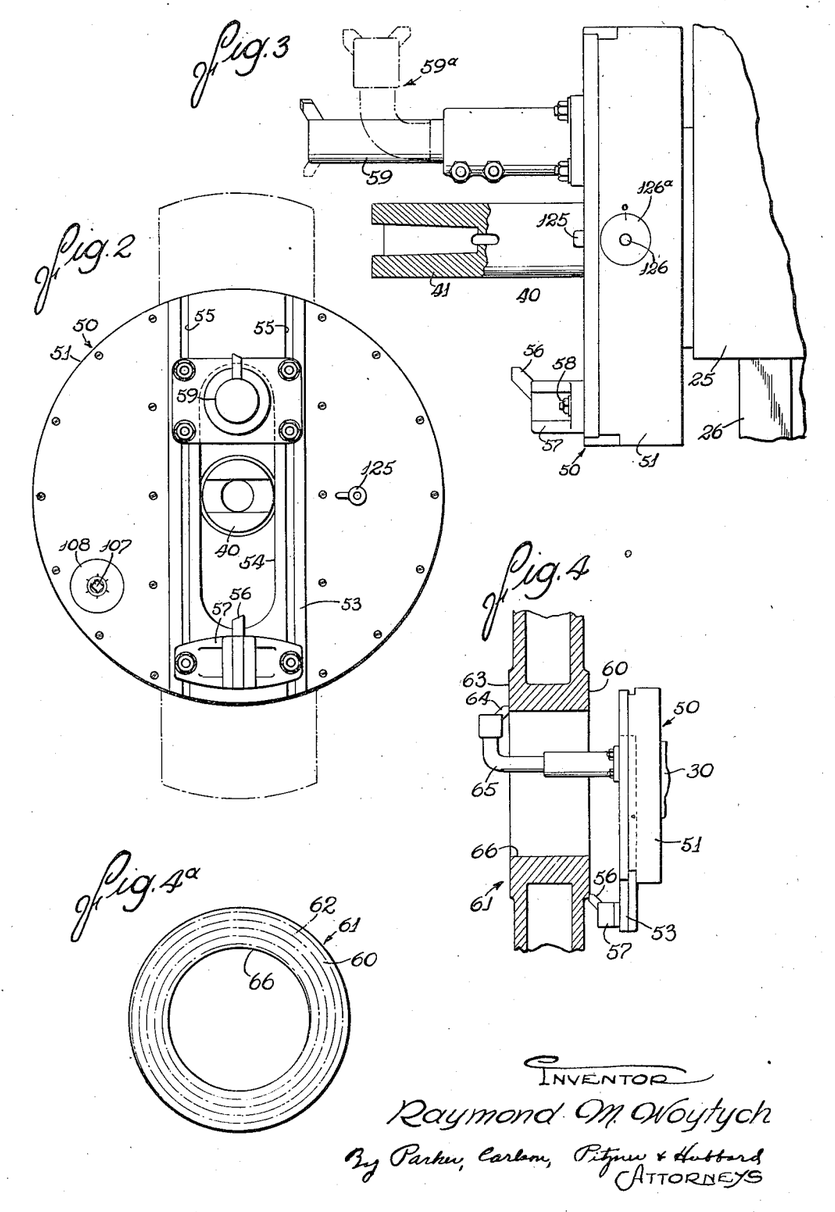
Fig. 2 is an enlarged front face view of the attachment included in the machine of Fig. 1.
Fig. 3 is a side elevation of the attachment and a fragment of the headstock to which it is attached.
Fig. 4 is a fragmentary view illustrating the use of the attachment with a plurality of facing tools.
Fig. 4a is a diagrammatic face view of the work piece shown in Fig. 4 and illustrating the spiral path of the facing tool.

For an example of the type of facing operation contemplated reference may be made to Figs. 4 and 4ᵃ. In Fig. 4 the facing tool 56 is shown in position for facing or scalping a surface 60 on a work piece 61, which is of course carried on the table 11 (Fig. 1). As the housing 51 is rotated and slide 53 traversed in timed relation the tool 56 moves over the work piece surface 60 in a spiral path indicated roughly by the dot-dash line 62 in Fig. 4ᵃ. At the same time an opposite surface 63 (Fig. 4) on the work piece 61 may be machined by a facing tool 64 fixed on the slide 53 by a gooseneck projecting through a bore 66 in the work piece. Alternatively, a boring tool (not shown) may be fixed on the end of spindle 40, as noted above, and used to machine the bore 66 at the same time the tool 56 is facing the work piece.

To feed the slide 53 in timed relation with the rotation of the attachment housing 51 a drive mechanism (Fig. 6) is utilized embodying a gear 67 carried by a stub shaft 67ᵃ journaled in the housing 51, at a point eccentric to the latter's axis of rotation. This gear 67 meshes with a stationary ring gear 68, bolted on the front of the headstock 25, and coaxial with the housing axis. Hence, as the gear 67 rolls about the periphery of the ring gear 68 during rotation of the housing 51 it is rotated in timed relation with the rotation of the attachment housing 51 and, thus in timed relation with the rotation of the facing tool 56. Accordingly, the rotating gear 67 is utilized to feed the slide 53 in its path transverse to the axis of housing rotation. The connection of the gear 67 with the slide 53 includes a change-speed gearing, designated generally by the numeral 69 (Figs. 5 and 7) and to which the gear 67 is connected through a spiral gear 70 and a pinion 71. At the driving end of the speed-change gearing 69 (Fig. 5) a pair of bevel gears 72—73 connect the driven shaft 74 of the gearing with a shaft 75, the other end of this latter shaft being connected through a reversing clutch mechanism 76 with a stub shaft 77. The reversing clutch 76 is controlled automatically, as will hereinafter appear, in conjunction with the speed-change gearing 69 so that rotation of the stub shaft 77 or power take-off device will be unidirectional, irrespective of the setting of the speed-change gearing. The stub shaft 77 is in turn connected through a manually controllable reversing clutch 78 and meshing pinions 79 and 80 with a screw 81. This screw meshes with an elongated segmental nut 82 fashioned on the edge of the slide 53 (Fig. 7) so that the slide is advanced endwise along the ways 52 by rotation of the screw 81. The direction of slide feed is, of course, controlled by the reversing clutch 78.

In brief, the slide 53 is fed at a rate depending upon the setting of the speed-change gearing 69, though always in timed relation with the rotation of the attachment housing 51. Additionally, the direction of slide feed is varied at will by the reversing clutch 78 and stopped completely by shifting this clutch to neutral. The speed-change gearing herein shown is described and claimed as such, in my copending application Serial No. 329,699, filed April 15, 1940, and which application is a division of this present case.

Attention may now be given to a more detailed consideration of the construction of various gearings, etc., included in the slide feed mechanism and heretofore only generally described. Turning first to the speed-change gearing 69, this gearing may be designated as being generally of the drive-key type but it is of a novel form such that gears of small diameter serve to accomplish a wide range of speed adjustments. The use of gears of small diameter is made possible by arranging the gearing so that the various selective gear connections are aditive, each speed setting preferably bearing a true geometric-progression relation to the other settings. In this way a gearing of small over-all dimensions is achieved, suitable for housing within a compact attachment head. The gearing herein shown is capable of six different speed settings. With respect to the compactness of the attachment it should be noted that the illustrative device is quite thin in an axial direction (Fig. 1) so that there is comparatively little overhang at the end of the spindle sleeve 30. The consequent minimization of overhanging weight on the sleeve is, of course, highly desirable.

Figure 5:
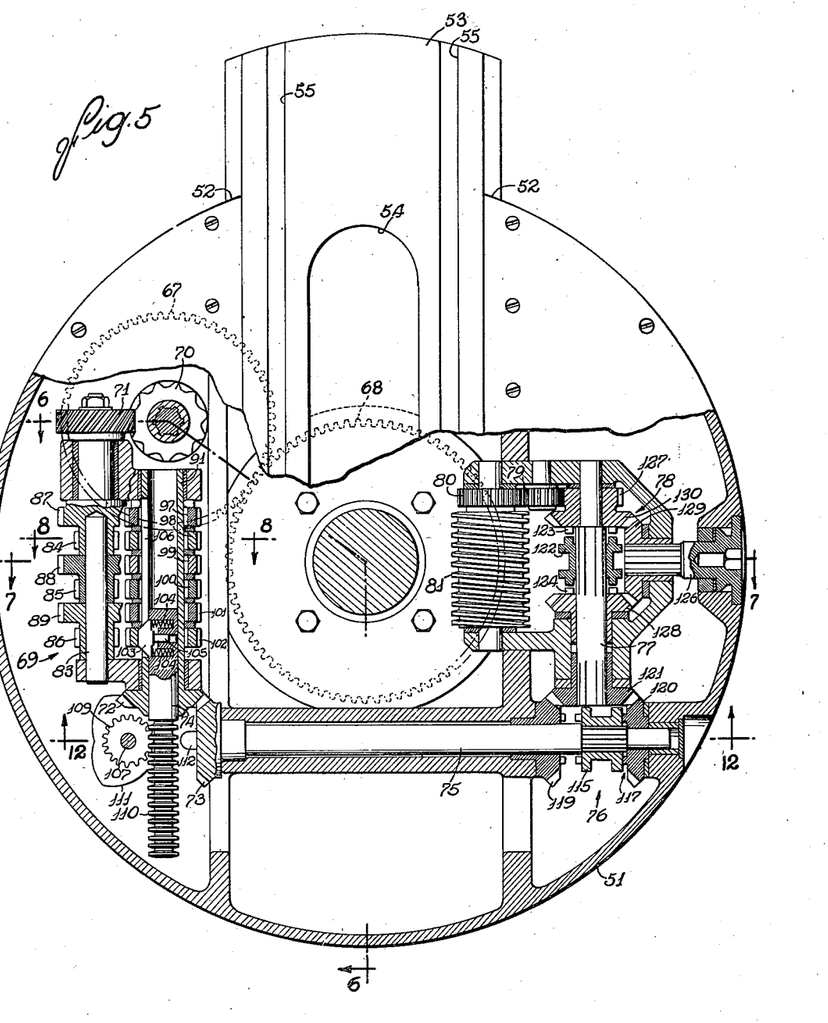
Fig. 5 is an enlarged front elevational view of the attachment with a portion of the cover broken away to show the arrangement of the interiorly located parts.
Figure 6:
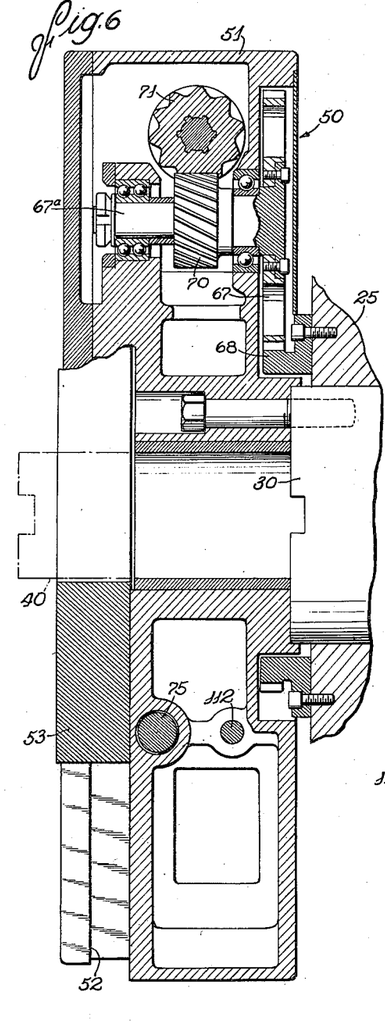
Figs. 6 and 7 are transverse sectional views of the attachment taken respectively along the lines 6—6 and 7—7 in Fig. 5.
Figure 8:
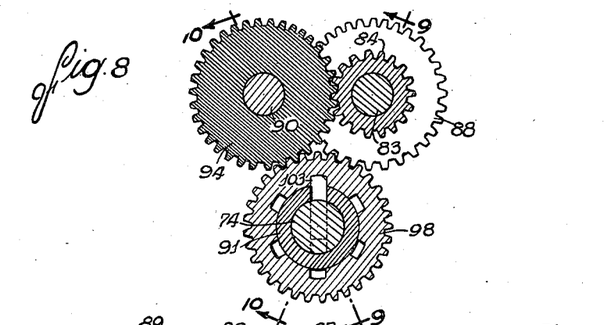
Fig. 8 is a transverse sectional view along the line 8—8 in Fig. 5 of the speed-change gearing included in the attachment.
Figure 9:
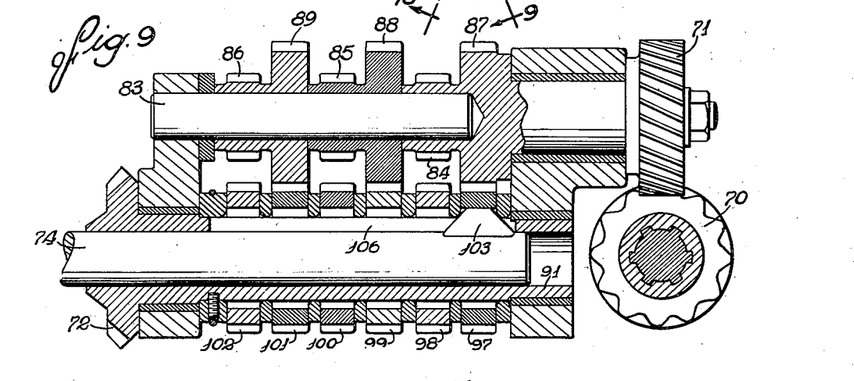
Figs. 9 and 10 are longitudinal, sectional views respectively along the lines 9—9 and 10—10 in Fig. 8.
Figure 10:
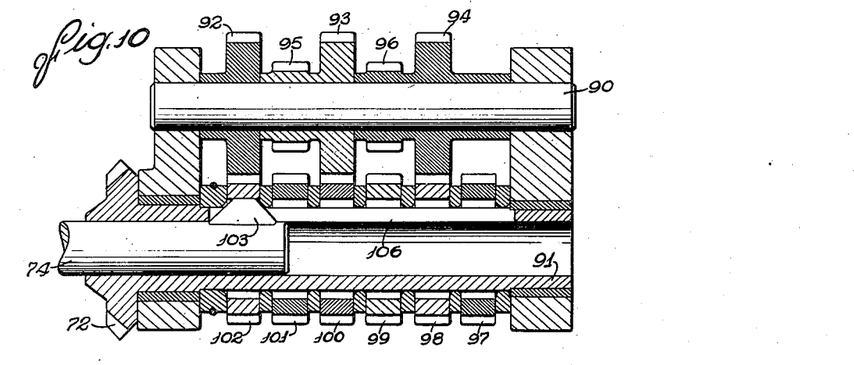

In the illustrative construction (Fig. 5) the driving pinion 71 is fast on a first driving gear cluster including a gear 87 and pinion 84. Coaxial with this gear cluster is a stationary shaft 83 also having loosely journaled thereon two further gear clusters each made up of one of the pinions 85 and 86, and a corresponding one of the gears 88 and 89 (see also Fig. 9). Further, the speed change gearing 69 includes a stationary intermediate shaft 90 (Figs. 8 and 10) and a hollow tubular shaft 91 within which is telescoped the driven shaft 74 (Figs. 5 and 10). On the intermediate shaft 90 are loosely journaled a gear 92 and two gear clusters made up respectively of gears 93 and 94, as well as pinions 95 and 96. On the shaft 91 six driven gears 97—102 are loosely journaled, which correspond to the six different speed settings of the speed-change gearing. To condition the gearing for a selected speed setting, the corresponding one of the driven gears is connected to the driven shaft 74 by a drive key 103 (Figs. 5 and 10). This drive key is of conventional form being yieldably urged into engagement with a registering one of the gears by springs 104. Pin 105 holds the drive key in position on the driven shaft 74 and the nose of the drive key projects through a slot 106 in the side wall of the tubular shaft 91 into engagement with a slot in the hub of the registering one of the driven gears (Fig. 8).

To shift the drive key 103 axially of the tubular shaft 91 into engagement with a selected one of the driven gears 97—102, a manually operable speed selection mechanism is provided. This mechanism includes a stub shaft 107 (Fig. 2) projecting from the attachment housing 51 and having a squared end to receive a hand crank (not shown). A dial 108 indicates the speed setting. Fast on the stub shaft 107 is a pinion 109 (Fig. 5) meshing with a circular toothed rack 110 on the free end of the shaft 74 so that rotation of the pinion 109 serves to shift the shaft 74 axially and to bring the drive key 103 into engagement with the desired one of the driven gears.

Figures 11, 12:
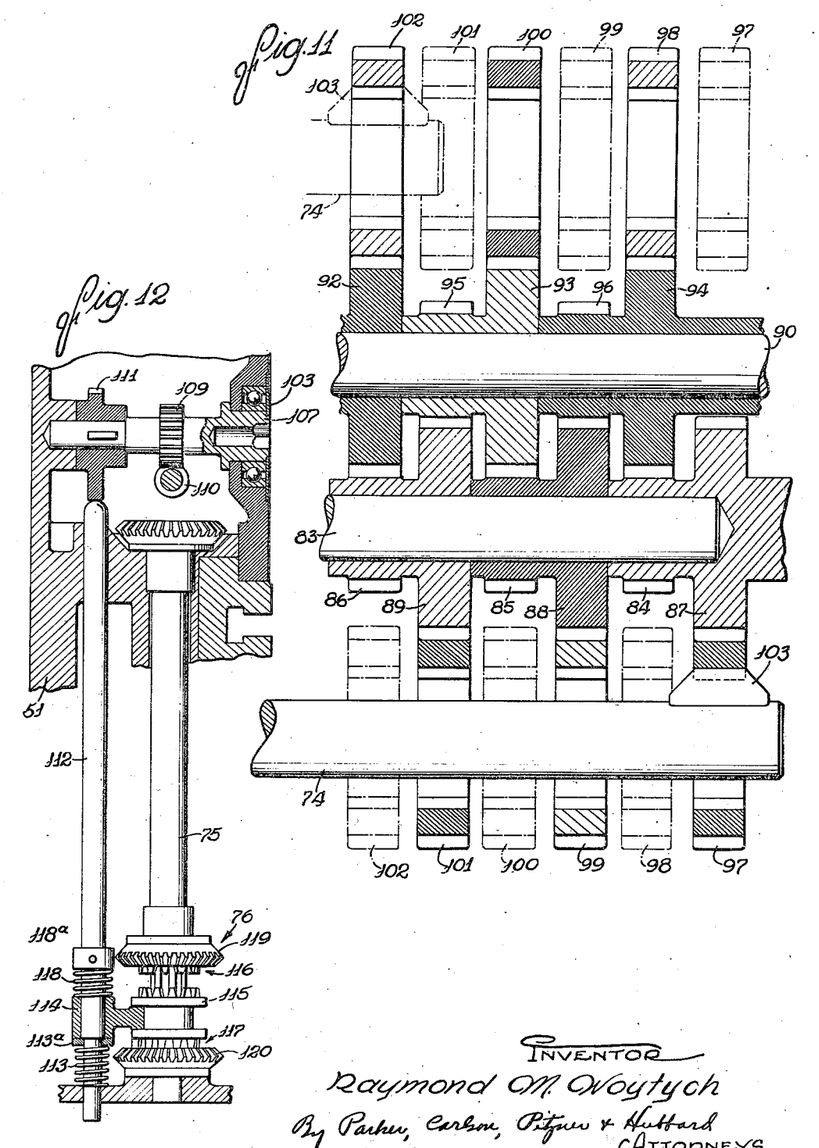
Fig. 11 is a diagrammatic layout of the speed-change gearing.
Fig. 12 is a sectional view along the line 12—12 in Fig. 5.

The various trains of gears which are active for the different speed settings can best be seen by reference to the diagrammatic layout in Fig. 11. In this layout or development of the gearing the series of driven gears have been reproduced at both the top and bottom of the figure. In the event that the drive key 103 engages, for example, the driven gear 97 (as shown in full lines in Fig. 11) the drive is directly from the driving gear 87 to the meshing driven gear 97. Similarly, when the drive key 103 is shifted into engagement with the next driven gear 98 the drive is from the drive pinion 84 to the meshing intermediate gear 94 and thence to the driven gear 98. The table below sets out the gear connections for the six different settings of the speed-change gearing.

| Speed setting | Driven gear keyed to driven shaft | Gear train to selected driven gear |
|---|---|---|
| 1 | 97 | 87-97 |
| 2 | 98 | 84-94-98 |
| 3 | 99 | 84-94-96-88-99 |
| 4 | 100 | 84-94-96-88-85-93-100 |
| 5 | 101 | 84-94-96-88-85-93-95-89-101 |
| 6 | 102 | 84-94-96-88-85-93-95-89-86-92-102 |

From an inspection of the foregoing tabulation it will be seen that the various driven gears are meshed into the series train of cluster gears at successive points. In this way all of the gears used in the second setting are used in the third, all of those in the third are used in the fourth, etc., so that a minimum number of gears are required for maximum variations in speed.

In the illustrative construction all of the driven gears 97—102 are substantially identical and all have pitch circles the same as those of the gear 92 and the gears in the various clusters. Though the pinions are of the same diametrical pitch as the gears they may have any particular desired ratio of tooth number to that of the corresponding gears depending upon the speed reduction desired. By way of example, the pinions may all have eighteen teeth and the gears all thirty-three teeth. In such case the ratios of speeds for the six different settings of the gearing constitute a geometric progression, which is an especially desirable relation since from such a series may be quickly and easily selected a suitable pitch for the facing tool spiral requisite for a particular facing operation.

The speed-change gearing 69 described above is such that the direction of rotation of the driven shaft 74 is reversed for alternate settings of the speed-change gearing. It is desirable, however, that the shaft 77 (Fig. 5) be driven unidirectionally despite changes in speed as previously noted and, accordingly, the reversing clutch 76 is arranged to be automatically actuated in accordance with the setting of the speed-change gearing so as to compensate for the reversals in the speed-change gearing. For this purpose a three lobe peripheral cam 111 (Figs. 5 and 12) is fixed on the setting-control shaft 107 of the speed-change gearing. An axially slidable cam follower rod 112 is urged against the cam 111 by a compression spring 113 bearing against a collar 113ª pressed against a shoulder on the rod (Fig. 12). A clutch shifter shoe 114 slidably carried on the rod 112 serves to shift a toothed clutch driver 115, which is splined on the shaft 75, into engagement with one or the other of the toothed driven clutch members 116—117. The cam 111 is indexed a sixth of a revolution for each step in the gear setting so it alternately brings a lobe and a depression into engagement with the cam follower rod 112 with the result that the upper and lower clutch members 116—117 are alternately engaged.

To avoid jamming and breakage of the clutch by positive actuation of it by the cam 111 when the clutch teeth are not in registry, a yieldable connection is used between the cam follower rod 112 and shifter shoe 114. For this purpose a second compression spring 118 is interposed between the shifter shoe and a collar 118ª pinned on the rod. With this arrangement when the rod 112 is pushed downward (as viewed in Fig. 12) by the cam 111, the thrust transmitted from the rod 112 through collar 118ª and spring 118 compresses the lower spring 113, thereby permitting the shifter shoe 114 to move down and engage the clutch driver 115 with the lower clutch member 117. In the event that the teeth on clutch parts 115 and 117 are not in registry at the instant the rod 112 descends, however, the spring 118 is also compressed to store up the thrust force and thereafter expands to push the shifter shoe 114 down as soon as the teeth do register on further rotation of the shaft 75. Similarly, when the upper end of the rod 112 rides into a low point on the cam 111 the spring 113 is released to thrust the rod 112 and shifter shoe 114 upward. Since this upward thrust is applied by a yieldable spring, however, final upward movement of the clutch driver 115 to engage the driven member 116 does not take place until the mating teeth are in registry.

Bevel gears 119—120 on the clutch driven members 116—117 respectively mesh with a bevel gear 121 (Fig. 5) on the shaft 77, so that this shaft is driven through one or the other of the clutch gears 119—120 depending upon the setting of the reversing clutch. Since the cam 111 is shifted coincidentally with changes in the speed-change gear setting the reversing clutch automatically retains the rotation of the shaft 77 unidirectional.

In order to control the direction of feed of the tool slide 53 the manually operable reversing clutch 78 is interposed between the unidirectional shaft 77 and the screw 81 which meshes with the segmental nut on the slide (Fig. 5). This reversing clutch 78 is of conventional form and embodies a shiftable clutch driver 122 splined on the shaft 77. This driver is shiftable from its neutral position illustrated alternatively into engagement with one or the other of the clutch driven members 123 or 124. A hand lever 125 on the front face of the attachment casing (Figs. 2 and 7) serves, upon oscillation, to shift the clutch driver 122 into either neutral, forward or reverse positions. When the clutch driver 122 is engaged with the driven member 123 the drive is completed directly from the shaft 77 through a pinion 127 fast on the clutch driven member 123 and through pinions 79 and 80 to the screw 81. Similarly, when the clutch shoe 122 is engaged with the other clutch driven member 124 a drive in the opposite direction is completed from the shaft 77 through a bevel gear 128 fast on the driven member 124, thence through an idler bevel gear 129 to the bevel gear 130, which in turn remains connected at all times with the screw 81 through pinions 79 and 80.

In addition to the power feed described above for the slide 53 provision is also made for manual adjustment of its position. Manual actuation is particularly desirable for accurate positioning of the slide to determine the diameter of a bore to be machined by a boring tool carried on the slide. To provide for such manual adjustment of the slide the outer end of a stub shaft 126 (Fig. 5) which carries the bevel gear 129 is socketed to receive a suitable hand wrench (not shown). By turning this shaft 126 the slide driving screw 81 is rotated through gears 129, 130 and pinions 127, 79 and 80. A micrometer dial 126ª on the side of the attachment head (Fig. 3) indicates the position of slide adjustment.

Brief résumé of operation

Assuming that it is desired to use only the facing tool 56 (Fig. 3) for making a spiral facing cut, the machine is first adjusted for the desired rate of feed for the tool holder slide 53. For this purpose the speed-change gearing 69 is set for the desired slide feed speed by turning the setting-control shaft 107 (Fig. 2). While the clutch controller 125 is in its neutral position the slide 53 is adjusted by hand, by turning shaft 126 (Fig. 3) as previously described, to bring the facing tool to the desired starting position. Then the clutch control lever 125 (Fig. 2) is shifted to connect the main clutch 78 (Fig. 5) for the desired direction of slide feed. After these preliminary operations rotation of the headstock sleeve 30 is started whereupon the facing tool is automatically traversed through a spiral path across the work piece face by the combined rotative and traversing movement imparted to it. The traversing of the slide 53 is accomplished in timed relation with the attachment rotation since the slide is driven from the gear 67 (Fig. 6) rolling about the fixed ring gear 68, through the medium of the speed-change gearing 69 (Fig. 5)

and main reversing clutch 78, all as heretofore described.

In the event it is desired to perform a boring operation simultaneously with the facing operation, a boring tool (not shown) is fixed on the socketed extension 41 on the spindle 40 (Fig. 3). The spindle 40 is advanced by either power or hand feed as previously described. Since this spindle projects through the center slot 54 in the slide 53 (Fig. 2) it does not interfere in any way with the latter's traversing motion.

The slide 53 may also be utilized for carrying a boring tool, such as the tool 59 (Fig. 3), rather than a facing tool. In such case the slide is adjusted along its ways by the hand adjustment shaft 126 until the tool is accurately located for the desired diameter of bore. The clutch 78 is, of course, left in neutral during the boring. To accomplish relative feeding motion of the tool and work axially of the bore, the saddle 16 (Fig. 1) is traversed along the ways 17.

I claim as my invention:

1. For use in a machine tool having a rotatable drive member, a tool support attachment embodying a housing rotatable with said drive member, said housing being formed with a guideway transverse to the axis of rotation, a tool holder slide mounted on said guideway, and means including a speed-change gearing mounted within said housing for traversing said slide along said guideway in timed relation to the housing rotation and at a speed determined by the setting of said speed-change gearing, said speed-change gearing including a plurality of gears arranged to be driven in a series gear train, a plurality of independently rotatable driven gears each meshing with a different gear in said train, and means for connecting any selected one of said driven gears in driving relation with said slide.

2. For use in a machine tool having a rotatable drive member, a tool support attachment embodying a housing rotatable with said drive member, said housing being formed with a guideway transverse to the axis of rotation, a tool holder slide mounted on said guideway, means including a speed-change gearing mounted within said housing for traversing said slide along said guideway in timed relation to the housing rotation and at a speed determined by the setting of said speed-change gearing, said speed-change gearing including two sets of gear clusters arranged with the clusters in each set coaxial and the axes of the two series parallel, each of said clusters embodying a pinion and a gear coaxially arranged and fixed together, said clusters in both of said sets being arranged in a single series train with the pinion of each cluster in one set meshing with the gears in the other set of clusters, a plurality of independently rotatable driven gears each meshing with a different one of the cluster gears, and means for connecting any selected one of said driven gears in driving relation with said slide.

3. In a facing attachment of the type set forth, the combination of a rotatable housing, a tool holder slide mounted for traversing movement on said housing along a path transverse to the axis of housing rotation, power actuated means within said housing for traversing said slide in timed relation with the housing rotation, said last mentioned means including a reversing mechanism comprising a pair of bevel gears each meshing with a third bevel gear, a driving member and a clutch shiftable from a central position alternatively to connect one or the other of said bevel gears to said driving member, driven means operatively connecting said slide in driven relation at all times to one of said pair of bevel gears so that the slide is driven from said driving member through said one bevel gear alone or through all three of said bevel gears in series in the corresponding alternative engaged positions of the clutch and is disconnected from the driving member when the clutch is in neutral, and manualy operable means for rotating said third bevel gear to traverse said slide by hand.

4. In a facing attachment of the type set forth, the combination of a rotatable housing, a tool holder slide mounted for traversing movement on said housing along a path transverse to the axis of housing rotation, power actuated means within said housing for traversing said slide in timed relation with the housing rotation, said last mentioned means including a reversing mechanism comprising a pair of bevel gears each meshing with a third bevel gear, a driving member and a clutch shiftable from a central position alternatively to connect one or the other of said bevel gears to said driving member, driven means operatively connecting said slide in driven relation at all times to one of said pairs of bevel gears so that the slide is driven from said driving member through said one bevel gear alone or through all three of said bevel gears in series in the corresponding alternative engaged positions of the clutch and is disconnected from the driving member when the clutch is in neutral, manually operable means for rotating said third bevel gear to traverse said slide by hand, and dial means coacting with said third bevel gear to indicate continuously the position of said slide whether it is moved by power or by hand.

5. In a machine tool, the combination of a rotatable tool spindle, a facing attachment including a generally cylindrical hollow casing with a closed front face, said casing being fixed to said spindle coaxial therewith for rotation with the same, a guideway on the front face of said casing extending generally diametrically across the same, a tool-supporting slide movable along the same, a stationary gear concentric with the axis of housing rotation, a drive gear mounted on said housing in mesh with said stationary gear to roll around the same in the course of housing rotation, a speed-change mechanism including a plurality of rotatable gears connected in driven relation to said drive gear and disposed within said casing at one side of its center with their axes of rotation forming chords with the cylindrical casing, a fixed nut on the slide, a rotatable screw driven by said speed-change mechanism and meshing with said nut, and said screw being journaled within the housing on the side thereof diametrically opposite said speed-change mechanism and with its axis of rotation paralleling those of the gears of said mechanism.

6. A facing attachment of the type set forth, comprising, in combination, a rotatable cylindrical hollow casing having a guideway extending generally diametrically across one end of said casing, a tool-supporting slide traversable along the guideway, power actuated means within the casing for traversing said slide including a speed-change gearing and a first rotatable toothed member meshing with a second complemental toothed member fixed to the slide, and characterized particularly by the disposition of said speed-change gearing and said pair of toothed members within said casing and on diametrically opposite sides of the axis of rotation thereof to minimize the over-all diameter of the casing.

7. A facing attachment of the type set forth, comprising, in combination, a rotatable cylindrical hollow casing having a guideway extending generally diametrically across one end thereof, a tool-supporting slide traversable along the guideway, power actuated means within the casing for traversing said slide including a speed-change mechanism, a reversing mechanism and a first rotatable toothed member meshing with a second toothed member fixed to the slide, and characterized particularly by the disposition of said power actuated means within said casing with said speed-change mechanism on one side of the casing axis of rotation and said reversing mechanism, as well as said pair of toothed members on the diametrically opposite side of said axis to minimize the over-all diameter of the casing and to distribute the weight of the parts within said casing concentrically about its axis of rotation.

8. In a facing attachment of the type set forth, the combination of a drive apparatus including a speed-change mechanism and a reversing mechanism disposed in spaced relation with rotatable elements of each mechanism having their axes of rotation parallel, means including a shaft transverse to said axes and extending between said mechanisms adjacent corresponding ends thereof for interconnecting the same in the form of a generally U-shaped assembly, a rotatable cylindrical casing arranged to house said mechanisms with said U-shaped assembly disposed therein to embrace the axis of rotation of the casing, a tool-carrier slide, guide means supporting said slide for movement on one end of said casing generally diametrically across the same, and means for connecting said slide in driven relation with said drive apparatus.

9. For use in a machine tool having a rotatable drive member, a unitary tool support attachment embodying a housing, means for detachably supporting said housing on the machine tool for rotation adjacent said drive member, said housing having a guideway thereon sustantially transverse to the axis of housing rotation, a tool holder slide traversable along said guideway, power actuated means encompassed within said housing for traversing said slide along said guideway in a direction independent of the direction of housing rotation and at a feed speed bearing a selectively variable ratio to the angular speed of housing rotation, said power actuated means including a driver element adapted to be revolved in timed relation with the rotation of said housing as well as a reversing mechanism and a speed-change gearing interposed between said driver element and said tool holder slide and all encased within said housing so as to be applicable as a unit to the machine tool.

RAYMOND M. WOYTYCH.